Patented Sept. 30, 1952

2,612,483

UNITED STATES PATENT OFFICE 2,612,483

FORMALDEHYDE-UREA ADHESIVES AND COATING COMPOUNDS

William C. Dearing, Toledo, Ohio, assignor to Libbey-Owens-Ford Glass Company, Toledo, Ohio, a corporation of Ohio No Drawing. Continuation of application Serial No. 425,353, January 1, 1942. This application October 3, 1947, Serial No. 777,859

10 Claims. (Cl. 260—29.4)

1

The invention relates to a delayed-acting hardener for formaldehyde-urea adhesives and coating compositions, and also to the preparation of formaldehyde-urea adhesives and coating compositions having delayed-hardening properties.

An aqueous solution of a formaldehyde-urea reaction product is valuable as an adhesive or a coating composition, because the reaction product in such a solution can be caused to become insoluble after the solution has been applied, to produce a water-resistant adhesive bond or surface coating. A formaldehyde-urea reaction product in aqueous solution is superior to other resin-formers in the ease and rapidity with which it can be converted into the insoluble state after being applied. Plywood that has been glued with an aqueous solution of a formaldehyde-urea reaction product, unlike plywood that has been glue with other thermosetting adhesives, does not need to be subjected to an elevated temperature in a heated press in order to convert the formaldehyde-urea reaction product into the insoluble resin. Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent that renders the composition acid and thus causes the formaldehyde-urea reaction product to harden or become insoluble. The hardening agents heretofore used in ordinary commercial practice are ammonium chloride and ammonium thiocyanate, which are not strongly acid in themselves, but which react with the free formaldehyde that is present in an aqueous solution of a formaldehyde-urea reaction product to form strongly acid hexamethylene-tetramine salts.

However, when an ammonium salt of a strong acid is added to an aqueous solution of a formaldehyde-urea reaction product in sufficient amount to cause the reaction product to harden after the solution has been applied as an adhesive or coating composition, the hardening takes place so rapidly that there is not sufficient time to apply the solution as an adhesive in ordinary practice.

The principal object of the invention is to provide novel agents which, when used with an aqueous solution of a formaldehyde-urea reaction product and an ammonium salt of a strong acid, produce an adhesive or coating composition that remains stable for a time, to permit it to be applied, and then hardens rapidly to produce a water-resistant bond or coating. More specific objects and advantages are apparent from the description, which merely discloses and illustrates the invention and is not intended to impose limitations upon the claims.

In accordance with the invention, an adhesive or coating composition is prepared from a water-soluble formaldehyde-urea reaction product and a substance selected from the group consisting of alkali metal sulfites and alkaline earth metal sulfites. Such a composition, when brought together in an aqueous medium with an ammonium salt of a strong acid, forms an adhesive or coating composition having delayed-hardening properties.

A composition embodying the invention may consist of a dry mixture of the formaldehyde-urea reaction product and the sulfite, which requires the addition of water, as well as an ammonium salt of a strong acid, in order to produce a delayed-hardening adhesive or coating composition.

Mixing with the sulfite of an alkali metal or alkaline earth metal does not affect the stability of an ordinary dry water-soluble formaldehyde-urea reaction product. A dry formaldeyde-urea reaction product is just as stable after such a sulfite has been incorporated as it would have been if the sulfite had been omitted.

The sulfites of alkali metals and alkaline earth metals are unique in that, when incorporated with a solid water-soluble formaldehyde-urea reaction product, they produce a composition which upon addition of an ammonium salt of a strong acid has delayed-hardening properties, and yet do not also tend to render the formaldehyde-urea reaction product unstable in storage or shipment.

It is highly advantageous to incorporate such a sulfite with a formaldehyde-urea reaction product that is sold in the form of a solid, for use as an adhesive or coating composition, because the addition of water and an ammonium salt of a strong acid to the resulting mixture produces a composition having delayed-hardening properties. If the ammonium salt of the strong acid is supplied by the manufacturer of the formaldehyde-urea reaction product, the salt may be shipped separately and added by the user just before the composition is applied. In that case, it is preferable to have the sulfite incorporated with the formaldehyde-urea reaction product, rather than with the ammonium salt, in order to reduce the amount of material that must be shipped and handled separately. If the manufacturer of the formaldehyde-urea reaction product does not supply the ammonium salt, it is still more desirable to have the sulfite incorporated with the formaldehyde-urea reaction product so that the user will not be required to add more than one ingredient, and will only be required to add the ammonium salt.

A delayed-acting hardener embodying the invention, which can be added to any water solution of a formaldehyde-urea reaction product to produce a delayed-hardening composition, comprises an ammonium salt of a strong acid and a sulfite of an alkali metal or alkaline earth metal. This hardener is preferably in the form of a dry mixture of the ammonium salt with the sulfite, because a dry mixture is the most convenient form for shipment.

Ordinarily an ammonium salt of a strong acid cannot be added to a water-soluble formaldehyde-urea reaction product until just before the reaction product is applied as an adhesive or coating composition, because the gelling or conversion of the formaldehyde-urea reaction product into an insoluble resin begins as soon as the ammonium salt is added. Thus it is ordinarily necessary to ship the ammonium salt of the strong acid separately from the formaldehyde-urea reaction product, and to rely upon the user to add the correct proportion of the ammonium salt just before the solution of the formaldehyde-urea reaction product is applied. A formaldehye-urea reaction product to which the user must add a hardening agent is not suitable for domestic use, because there are no facilities in the ordinary home for measuring out the exact amount of hardening agent required for use with a given quantity of a water-soluble formaldehyde-urea reaction product.

Accurate measurement of the amount of hardening agent to be added to a given quantity of a water-soluble formaldehyde-urea composition is important. If too much hardening agent is added, the adhesive may gel or harden so rapidly that there is no time for applying it. If too little hardening agent is added, the composition will not harden properly, and will not produce a satisfactory bond or coating.

In commercial practice an ordinary ammonium salt of a strong acid, such as ammonium chloride, cannot be added even to a dry water-soluble formaldehyde-urea reaction product, because the addition of dry ammonium chloride to a dry water-soluble formaldehyde-urea reaction product causes rapid hardening of the reaction product, even in the dry state, so that the mixture soon becomes insoluble and worthless.

A dry mixture comprising a water-soluble formaldehyde-urea reaction product, the sulfite of an alkali metal or alkaline earth metal, and an ammonium salt of a non-volatile strong acid, such as ammonium sulfate, ammonium dihydrogen phosphate, diammonium hydrogen phosphate or ammonium oxalate, constitutes a stable dry adhesive or coating composition embodying the invention. Ammonium oxalate, when used in this composition, may contain 2 mols of water of crystallization for each mol of ammonium oxalate. Such a dry mixture is stable over long periods of time. Its stability is not appreciably different from the stability of the dry formaldehyde-urea reaction product alone containing no hardening agent. Upon addition of water to the dry mixture, however, a delayed-hardening composition is formed. Such a dry mixture is suitable for domestic use as an adhesive, because a delayed-hardening adhesive is prepared by simply adding water to the dry material. The batch of adhesive solution prepared from the dry mixture may be as small or as large as desired, and it always contains the correct proportion of hardener.

Since the hardening agent is already contained in such a mixture, it is not necessary for the user to weigh out successive portions of hardening agent as successive portions of adhesive are removed from the container. Each batch of adhesive solution can be made up as it is needed, by simply removing the desired amount of the dry mixture from the container and dissolving it in water.

The term "strong acid" is used herein to denote an acid that is strong enough so that a one percent aqueous solution of the acid has a pH not greater than about 4. An ammonium salt of a weaker acid cannot be employed successfully as a hardening agent, because it would not render the aqueous solution sufficiently acid to make it harden properly after being applied. Although ammonium salts of non-volatile strong acids may be used in a stable dry composition embodying the invention, an ammonium salt of a strong volatile acid, such as ammonium chloride, ammonium thiocyanate or ammonium nitrate, cannot be used in a dry mixture with a water-soluble formaldehyde-urea reaction product. An ammonium salt of a strong volatile acid would cause the formaldehyde-urea reaction product in such a mixture rapidly to become insoluble, and an ammonium salt of a strong volatile acid cannot be added until just before the composition is applied.

As used herein, the term "dry mixture" denotes a composition that is dry to the touch. A formaldehyde-urea reaction product that is dry to the touch, such as the product obtained by spray-drying an aqueous solution of a formaldehyde-urea condensation product, may contain 1 per cent or more of moisture, and such an amount of moisture does not affect the stability of a mixture embodying the invention. A dry mixture embodying the invention is preferably in granular or powdered form, so that it will dissolve rapidly upon the addition of water.

In the preparation of a stable dry mixture embodying the invention, crystals of the sulfite and, if desired, the ammonium salt of a non-volatile strong acid may simply be mixed with the granular or powdered formaldehyde-urea product. Preferably, the composition is not ground in a ball mill or other pulverizing apparatus after the sulfite or the ammonium salt of the non-volatile strong acid has been added to the formaldehyde-urea reaction product. If a dry composition containing a formaldehyde-urea reaction product is to be stored for a substantial period of time or shipped a substantial distance, the formaldehyde-urea reaction product should be prepared in a substantially neutral condition, because a formaldehyde-urea reaction product that is appreciably acid or strongly alkaline is unstable even when no hardening agent whatsoever has been added to it.

Regardless of the form in which the formaldehyde-urea reaction product is shipped to the user, whether in the form of a solid or in the form of an aqueous solution, and regardless of the stage at which the sulfite or the ammonium salt of the strong acid is added to the formaldehyde-urea reaction product, the essential purpose of the invention is the preparation of a composition from water, a water-soluble formaldehyde-urea reaction product and the sulfite of an alkali metal or alkaline earth metal, which is applied, together with an ammonium salt of a strong acid, as an adhesive or coating composition.

When an ammonium salt of a volatile or non-volatile strong acid is incorporated in an aqueous solution of a formaldehyde-urea reaction product, the salt reacts with the free formaldehyde that is present in the solution, to form the hexamethylenetetramine salt of the same acid. Since this hexamethylenetetramine salt is much more acid than the original ammonium salt, the reaction causes the solution to become acidified. Then, as soon as the acidity of the solution has reached about pH 4, the acid condition of the solution causes the hardening of the formaldehyde-urea reaction product to become appreciable; the greater the acidity of the solution, the greater is the speed of hardening.

When an ammonium salt of a strong acid is added to an ordinary aqueous solution of a formaldehyde-urea reaction product, there is an immediate sharp increase in acidity, followed by a further gradual increase. It has been discovered that the immediate sharp increase in acidity is caused by the combining of the free formaldehyde in the solution with some of the ammonium salt, to form a strongly acid hexamethylenetetramine salt, and that the further gradual increase in acidity is caused by formaldehyde which is gradually split off from the formaldehyde-urea reaction product, and which combines with more of the ammonium salt as fast as it is split off. The resulting gradual formation of additional hexamethylenetetramine salt causes the gradual increase in acidity that follows the initial sharp increase in acidity.

In its normal state of equilibrium, the solution of the formaldehyde-urea reaction product contains a certain concentration of free formaldehyde. Upon the addition of the ammonium salt, when this free formaldehyde is suddenly used up by reaction with the ammonium salt, the equilibrium of the solution is disturbed. Additional formaldehyde is then gradually split off from the formaldehyde-urea reaction product, because the tendency is toward restoration of equilibrium. So long as the solution contains an excess of the ammonium salt, the normal concentration of free formaldehyde cannot be restored, and formaldehyde continues to be split off from the formaldehyde-urea reaction product as the tendency toward restoration of equilibrium continues. Thus, after the initial sharp increase in acidity which occurs upon addition of the ammonium salt, the further gradual increase in acidity continues until the ammonium salt has all been converted into a hexamethylenetetramine salt, or until the formaldehyde-urea reaction product has completely hardened.

When a sufficient quantity of an ammonium salt of a strong acid to cause hardening is incorporated in an ordinary aqueous solution of a formaldehyde-urea reaction product, to which no sulfite of an alkali metal or alkaline earth metal has been added, the initial sharp increase in acidity is so great that the solution hardens too rapidly to permit it to be applied as an adhesive or coating composition in ordinary practice. If the solution is to be used as an adhesive or coating composition, it is ordinarily necessary to resort to a serious reduction in the amount of ammonium salt used, and as the result of such reduction the composition may not become acid enough to harden satisfactorily after it has been applied.

In accordance with the invention, this difficulty is overcome by incorporating in the solution the sulfite of an alkali metal or alkaline earth metal. As soon as the sulfite of the alkali metal or alkaline earth metal is incorporated in the aqueous solution of the formaldehyde-urea reaction product, it reacts with formaldehyde in the solution, forming the hydroxide of the metal and an addition product of 1 molecule of formaldehyde with an equivalent of the bisulfite of the metal. This reaction of the sulfite with formaldehyde in the solution is, if anything, more rapid than the reaction of an ammonium salt with formaldehyde in the solution.

The reaction of the sulfite with formaldehyde in the solution has a two-fold retarding effect. In the first place, the reaction of the sulfite with formaldehyde liberates a strong base. As such base is liberated, it neutralizes some of the acid hexamethylenetetramine salt which is formed by reaction of the ammonium salt with formaldehyde in the solution. Thus the strong base formed by reaction of the sulfite with formaldehyde in the solution causes the initial sudden increase in acidity to be much less than it would have been if no sulfite had been incorporated in the solution.

In the second place, the sulfite uses up a substantial part of the free formaldehyde that is present in the solution at the time of the addition of the ammonium salt of the strong acid. By using up some of the free formaldehyde in the solution, the sulfite reduces the amount of free formaldehyde that is available for immediate reaction with the ammonium salt of the strong acid, and thus further restricts the initial increase in acidity that occurs upon incorporation of the ammonium salt in the solution. This additional mode of retarding the increase in the acidity of the solution, i. e., by using up a substantial part of the free formaldehyde that would otherwise be available for reaction with the ammonium salt of the strong acid, is highly advantageous because it entails only a temporary retarding of the increase in acidity of the solution, and this additional retarding effect is obtained without the incorporation in the solution of any additional base which might reduce the ultimate acidity obtainable.

In order to take full advantage of the retarding effect of the sulfite, the operator should not incorporate the sulfite in an aqueous solution of a formaldehyde-urea reaction product a substantial period of time before, or a substantial period of time after the incorporation of the ammonium salt of the strong acid in the solution. Preferably, the sulfite and the ammonium salt are incorporated simultaneously in the aqueous solution of the formaldehyde-urea reaction product. Incorporation of either the ammonium salt or the sulfite alone impairs the stability of an aqueous solution of a formaldehyde-urea reaction product.

Preferably, the amount of the sulfite which is incorporated in the solution is such that substantially all of the alkali formed by reaction of the sulfite with formaldehyde is neutralized by the initial sudden generation of the acid hexamethylenetetramine salt which occurs upon incorporation of the ammonium salt in the solution.

The subsequent gradual increase in acidity, which occurs as the ammonium salt combines with the additional formaldehyde that is gradually split off from the formaldehyde-urea reaction product, can then take place unhampered, because the potential alkalinity of the sulfite has all been used up. This further increase in acidity is so gradual that there is plenty of time for applying the solution. A solution so prepared may remain stable for as long as twenty-four hours before it begins to harden or gel.

At the end of this period of stability or liquid life, the amount of additional formaldehyde that has been split off from the formaldehyde-urea reaction product and has reacted with the ammonium salt is such as to produce a sufficient quantity of the strongly acid hexamethylenetetramine salt to cause the composition to harden.

An important advantage of the present invention is that because of the addition of the sulfite, a large excess of an ammonium salt of a strong acid can be incorporated in the aqueous solution without causing the solution to harden at an inconveniently rapid rate. The sulfite may be used to react with a substantial proportion of the free formaldehyde in the solution, and the alkali produced by such reaction also neutralizes a substantial part of the initial quantity of the acid hexamethylenetetramine salt that is generated immediately after the incorporation of the ammonium salt in the solution. The excess of the ammonium salt is then converted into the strongly acid hexamethylenetetramine salt only as additional formaldehyde is split off from the formaldehyde-urea reaction product. Since the increase in acidity of such a solution can occur no more rapidly than the liberation of formaldehyde from the formaldehyde-urea reaction product, the excess of the ammonium salt does not cause the solution to become acid appreciably faster than it would if no such excess were present.

However, such an excess of the ammonium salt, which remains unreacted during the period of stability or liquid life of the solution, will finally become converted into the hexamethylenetetramine salt, so that the solution will eventually become very acid. Thus, after the solution has been applied as an adhesive or coating composition, and after the expiration of the period of liquid life, more and more of the strongly acid hexamethylenetetramine salt is formed from the excess of the ammonium salt, and the hardening of the composition accelerates after it has been applied. The high ultimate acidity of the composition also causes very complete conversion of the formaldehyde-urea reaction product into the insoluble resin, so that a bond or coating of high water resistance is produced.

For example, an adhesive can be prepared from ammonium chloride, water, a water-soluble formaldehyde-urea reaction product and the sulfite of an alkali metal or alkaline earth metal that takes five times as long to harden as an adhesive prepared in the same manner with the sulfite and half of the ammonium chloride omitted. The latter adhesive hardens so rapidly that it cannot be used in ordinary commercial practice. Yet, after the latter adhesive has been applied, the resulting bond takes longer to attain its maximum strength than the bond from the former adhesive the hardening of which has been retarded.

It should be noted that when the present invention is carried out, the alkali produced from the sulfite is neutralized by the hexamethylenetetramine salt of the strong acid, i. e., is converted into the alkali metal or alkaline earth metal salt of the strong acid. So long as there is a sufficient excess of the ammonium salt of the strong acid to produce the desired acidity, this metal salt which is present in the adhesive does not interfere in any respect with the hardening of the adhesive bond. The addition product of formaldehyde with the bisulfite of the metal, which is produced by the reaction of the sulfite with formaldehyde, is substantially neutral and therefore inert in the composition.

One of the outstanding advantages of the sulfite of an alkali metal or alkaline earth metal as a retarding agent is that it is substantially neutral, and can therefore be mixed with a dry formaldehyde-urea reaction product without impairing the stability of the reaction product during storage or shipment. When water is added to the mixture of the sulfite with the formaldehyde-urea reaction product, a reaction takes place, as explained above, with the production of a strong alkali in the solution, which retards the action of the hardening agent that is used. However, this alkali is not formed until water is added to a mixture of the sulfite with the formaldehyde-urea reaction product, and the sulfite itself is substantially neutral. An alkali cannot be incorporated as a retarding agent in a dry formaldehyde-urea composition, because mixing a dry alkali with a dry formaldehyde-urea reaction product impairs the stability of the reaction product.

In the practice of the present invention, the ammonium salt of the strong acid may be incorporated in a solution that is to be applied as an adhesive or coating composition, by simply adding water to a dry mixture of the formaldehyde-urea reaction product with the ammonium salt and the sulfite, or by adding the ammonium salt together with the sulfite to an aqueous solution of the formaldehyde-urea reaction product, or in any other desired manner. In any case, after the surfaces are brought together with the adhesive layer between, the ammonium salt causes the hardening of the formaldehyde-urea reaction product. Fillers or extenders may be used in the adhesive if desired.

After an adhesive embodying the invention has been applied, the assembled surfaces to be glued can be held at ordinary temperatures while the adhesive hardens. Plywood panels and similar articles may be placed under pressure while the adhesive hardens. A heated press can be used to secure quick hardening of the adhesive, or plywood panels, after being clamped together, may be stored at an elevated temperature to hasten the hardening.

The amount of water used in preparing an adhesive or coating composition solution in accordance with the invention is simply an amount sufficient to give the desired consistency, and will vary with different proportions of filler or extender.

The amount of the sulfite of an alkali metal or alkaline earth metal is simply an amount sufficient to give the desired delay in the hardening of the composition, and will depend upon the initial acidity or alkalinity of the formaldehyde-urea reaction product. Of course the amount of the sulfite used should not be so great as to retard unduly the hardening of the composition after it has been applied.

The amount of the ammonium salt of the strong acid that is employed is simply an amount sufficient to cause the composition to harden properly after being applied. The amount of the ammonium salt of the strong acid, such as ammonium sulfate, ammonium chloride, ammonium bromide or ammonium thiocyanate, should be substantially more than half the chemical equivalent of the amount of the sulfite. If an ammonium salt of a strong organic acid such as ammonium oxalate, as distinguished from an ammonium salt of a strong mineral acid such as ammonium chloride, is employed, a still greater amount of the salt may be used, because the organic acid is not as strong as the mineral acid. An increased amount of the ammonium salt of a strong acid must also be employed if the adhesive is allowed to harden at ordinary temperatures, because the hardening of a formaldehyde-urea reaction product in the presence of an acid hardening agent is much slower and less complete at ordinary temperatures than at elevated temperatures.

In carrying out the present invention, any water-soluble formaldehyde-urea reaction product may be employed than has the proper solubility to form an aqueous solution of the desired concentration. Such a reaction product is most readily obtained by reacting formaldehyde and urea in an aqueous solution.

Although an aqueous composition prepared in accordance with the invention is particularly useful as an adhesive, it may also be used as a coating or impregnating composition, or for other purposes.

In the following examples, the sodium sulfite may be replaced by an equivalent amount of potassium, lithium, calcium, strontium or barium sulfite.

*Example 1*

1 mol of urea is added to a 37 per cent aqueous solution containing 2 mols of formaldehyde that has been brought to pH 4.5–5.5 by means of sodium hydroxide. The solution is then gently refluxed long enough (about 2 hours) to carry the condensation to a suitable stage, after which the solution is neutralized. The solution may then be evaporated to the desired concentration for shipment or use. 1 part of sodium sulfite for every 200 parts of formaldehyde-urea reaction product may be added when the solution is being prepared for use as an adhesive or coating composition, together with about 2 parts of ammonium chloride for every 200 parts of formaldehyde-urea reaction product to cause the composition to harden after it has been applied.

*Example 2*

An aqueous solution of a formaldehyde-urea reaction product prepared in accordance with the foregoing example, after being neutralized, is diluted with water or evaporated under vacuum to the proper concentration for spray-drying or vacuum drum-drying. With 100 parts of the dried granular formaldehyde-urea reaction product are mixed 1 part of sodium sulfite and 3 parts of ammonium sulfate. The resulting dry mixture is stable for an indefinite period. Whenever it is to be used, sufficient water is added to produce the desired consistency. The resulting aqueous composition has delayed-hardening properties, and may be used as an adhesive or as an impregnating agent.

Various embodiments of the invention may be devised to meet various requirements.

This is a continuation of application Serial No. 425,353 filed January 1, 1942 and now abandoned.

Having described the invention, I claim:

1. A stable dry mixture comprising a water-soluble formaldehyde-urea reaction product, an ammonium salt of a non-volatile strong acid, and a substance selected from the group consisting of alkali metal sulfites and alkaline earth metal sulfites, said mixture, upon addition of water, forming a delayed-hardening composition.

2. A stable dry mixture comprising a water-soluble formaldehyde-urea reaction product, diammonium hydrogen phosphate, and sodium sulfite, said mixture, upon addition of water, forming a delayed-hardening composition.

3. A dry composition comprising a thermosetting condensation product of formaldehyde and urea, ammonium sulfate and sodium sulfite, the ammonium sulfate being in an amount in excess of the sodium sulfite on a weight basis and also being sufficient eventually to liberate by reaction with the formaldehyde present in said condensate, when dissolved in water, enough acid to harden said composition and said sulfite being present in an amount sufficient to reduce the condensation of free formaldehyde in said composition.

4. A method of preparing a delayed-hardening composition that comprises bringing together water, a water-soluble thermosetting formaldehyde-urea reaction product, an amount of an alkali metal sulfite sufficient to reduce the concentration of free formaldehyde in the composition, and an amount of an ammoniun salt of a strong acid that is more than half the chemical equivalent of the amount of the sulfite and also is sufficient eventually to liberate by reaction with formaldehyde enough acid to harden the composition.

5. A method as claimed in claim 4 in which the sulfite is sodium sulfite.

6. A delayed-hardening composition prepared in accordance with the method of claim 5.

7. A delayed-hardening composition prepared in accordance with the method of claim 4.

8. A method of preparing a delayed-hardening composition that comprises bringing together water, a water-soluble thermosetting formaldehyde-urea reaction product, an amount of a substance selected from the group consisting of alkali metal sulfites and alkaline earth metal sulfites sufficient to reduce the concentration of free formaldehyde in the composition, and an amount of an ammonium salt of a strong acid that is more than half the chemical equivalent of the amount of the sulfite and also is sufficient eventually to liberate by reaction with formaldehyde enough acid to harden the composition.

9. A method of preparing an adhesive which contains a bisulfite-ion providing material and is useful for incorporation with an extender, that comprises bringing together water, a water-soluble thermosetting formaldehyde-urea reaction product, an amount of a substance selected from the group consisting of alkali metal sulfites and alkaline earth metal sulfites sufficient to reduce the concentration of free formaldehyde in the composition, and an amount of an ammonium salt of a strong acid that is more than half the chemical equivalent of the amount of the sulfite and also is sufficient eventually to liberate by reaction with formaldehyde enough acid to harden the adhesive, the proportions of said ingredients being such that the composition, after the addition of an extender, has the proper consistency for use as an adhesive.

10. An adhesive that contains a bisulfite-ion providing material and is useful for incorporation with an extender, comprising water, a water-soluble thermosetting formaldehyde-urea reaction product, a bisulfite-formaldehyde addition product, and an amount of an ammonium salt of a strong acid that is sufficient eventually to liberate by reaction with formaldehyde enough acid to harden the adhesive, the proportions of said ingredients being such that the composition, after the addition of an extender, has the proper consistency for use as an adhesive.

WILLIAM C. DEARING.

REFERENCES CITED

The following references are of record in the file of this patent:

UNITED STATES PATENTS

| Number | Name | Date |
|---|---|---|
| 2,193,630 | Howald | Mar. 12, 1940 |
| 2,223,817 | Cordier | Dec. 3, 1940 |
| 2,322,888 | Schwartz | June 29, 1943 |
| 2,388,143 | Harris | Oct. 30, 1945 |
| 2,407,599 | Auten | Sept. 10, 1946 |
| 2,412,855 | Auten | Dec. 17, 1946 |
| 2,413,624 | Harris | Dec. 31, 1946 |

FOREIGN PATENTS

| Number | Country | Date |
|---|---|---|
| 476,608 | Great Britain | Dec. 13, 1937 |